July 21, 1964  E. E. ROACH  3,141,332
LIQUID VOLUME COMPENSATOR
Filed Feb. 5, 1960  2 Sheets-Sheet 1
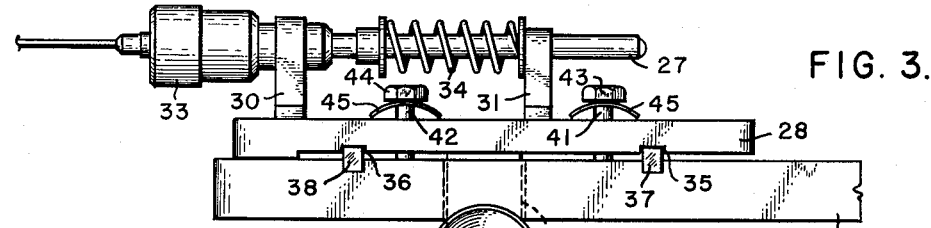
FIG. 3.
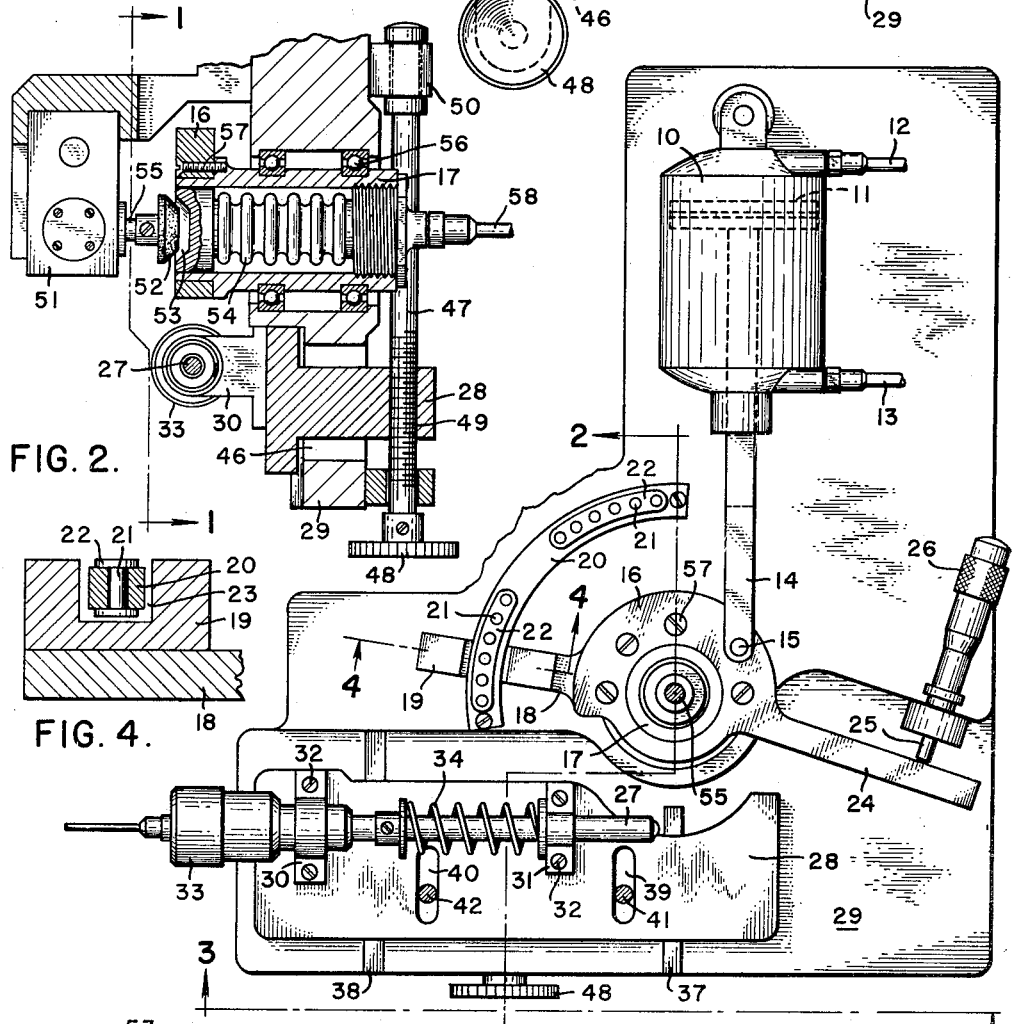
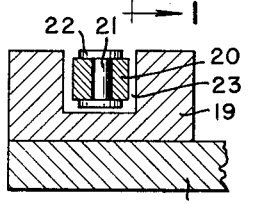
FIG. 4.
FIG. 1.
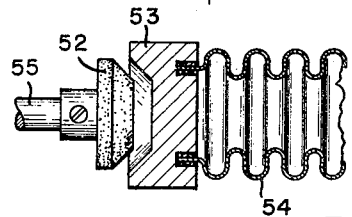
FIG. 5
INVENTOR.
ERSKINE E. ROACH,
BY
ATTORNEY

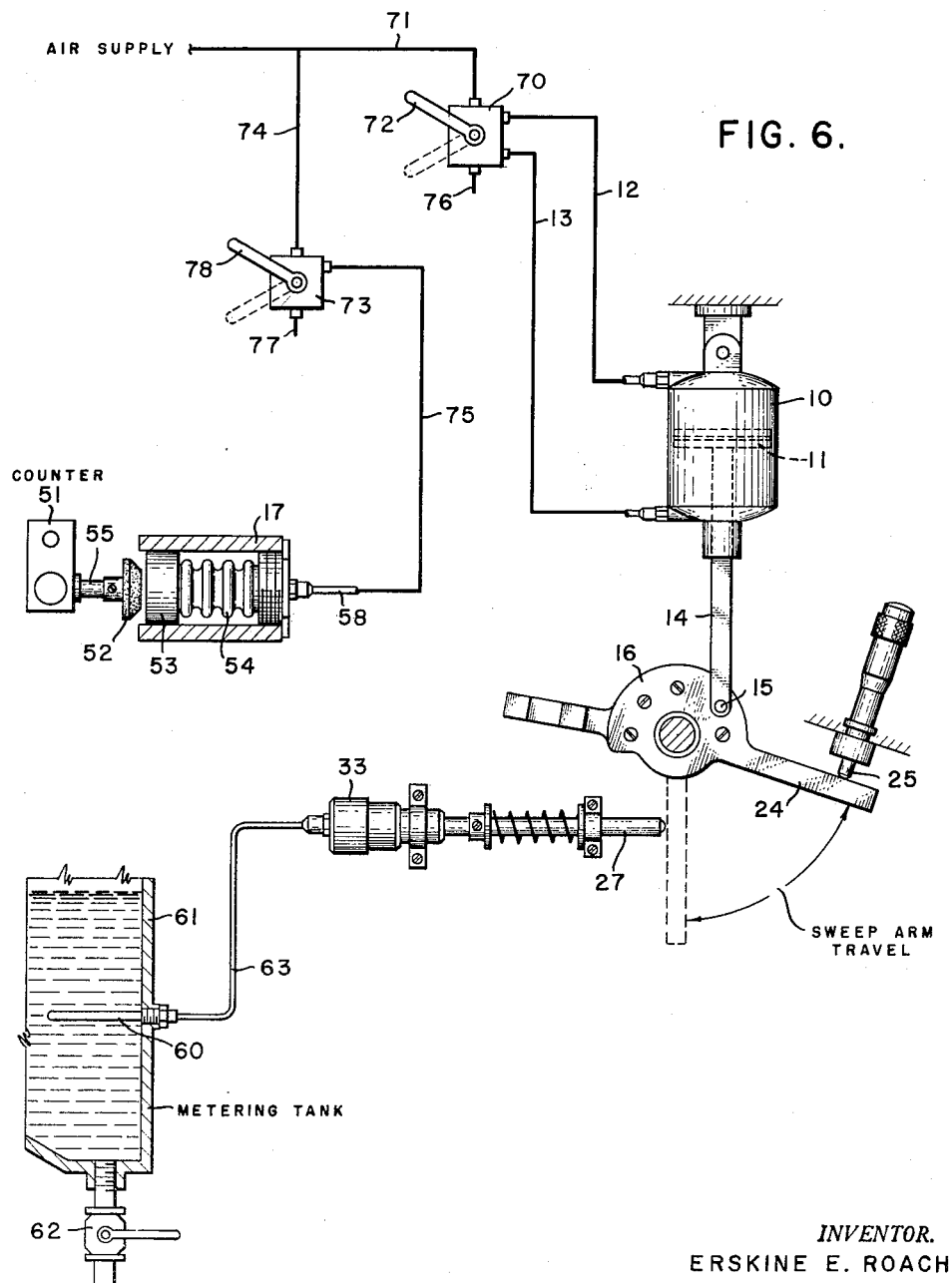

United States Patent Office 3,141,332
Patented July 21, 1964

3,141,332
LIQUID VOLUME COMPENSATOR
Erskine E. Roach, Houston, Tex., assignor, by mesne assignments, to Jersey Production Research Company, Tulsa, Okla., a corporation of Delaware
Filed Feb. 5, 1960, Ser. No. 6,913
1 Claim. (Cl. 73—223)

This invention concerns apparatus for correcting the volume of liquid measured in a metering tank to correct for differences between the actual volume of the tank and a standard volume or to compensate for volume differences of the liquid being measured resulting from changes in a factor or factors such as temperature, basic sediment and water (BS & W), gravity, or flashing, that affect the measurement of the liquid.

Until recently, endeavors to correct or compensate for the volume differences of a liquid being measured in a metering tank, involved changing the actual volume of the meter tank. In U.S. patent application Ser. No. 645,264, entitled, "Temperature Compensator for Intermittent Dump Meter," filed March 11, 1957, by Stephen S. Brown, now U.S. Patent No. 3,094,872, apparatus is disclosed which provides for compensating for volume differences of a liquid or for differences in tank volumes by controlling the amount of rotation of a counter shaft of a registering or recording counter device. In this apparatus a constant correction for a volumetric change in the liquid may be applied to the counter by rotation of the counter shaft a specific amount to compensate for a constant volumetric difference between the volume of the tank and a standard volume or if the correction is one which varies in proportion to variations in a factor or factors that affect measurement of the liquid, it may be applied to the counter by rotation of the counter shaft an amount proportional to changes in the factor.

U.S. patent application Ser. No. 859,966, filed December 16, 1959, by Norman A. Nelson, entitled "Liquid Volume Compensator," now U.S. Patent No. 3,100,396, discloses and claims apparatus that is an improvement over apparatus of this nature. Specifically, the Nelson apparatus substitutes a rotatable shaft and a sweep arm, the movement of which is confined between stops for the linearly movable gear arrangement of the Brown patent application. Also, the Nelson application substitutes an engageable-disengageable clutch for the overriding clutch mechanism of the Brown patent application for registering the amount of rotation of the rotatable shaft.

The present invention is an improvement over both of the apparatus in that a retracting metallic bellows is substituted for the splined shaft connection to one of the clutch faces. Also, instead of the piston type dampening means of the Nelson application, the present invention includes a magnetic dampening means. Further, the present invention provides for maintaining the movable probe in position by forming the support, upon which the probe is mounted, of a metal of a different coefficient of expansion than the metal of which the stationary base is formed.

The clutch design of the Nelson type requires clearance which may after wear become a source of mechanical error and since the use of the positive type clutch is justified as the means of eliminating linkages and other mechanisms for transmitting motion, it is desirable that the movable element of the clutch not be subject to any torsional deflection or movement independent of the transmitting shaft. Since the bellows is extremely flexible for lateral movement and at the same time resists any torsional deflection under loads anticipated for rotating the counter, it is particularly suited. The structural characteristic of a bellows makes its use a simple solution to the above problem. Wear and manufacturing tolerances are not a problem.

As to the magnetic dampening portion of the invention, in the operation of the compensated counter, it is important that the operating forces which drive the mechanism be kept to a minimum so that application of a high mechanical load to the movable section of the factor sensing element is prevented. The maximum load which can be applied to the factor sensing element without introducing serious error depends upon its design; e.g., the critical load for vapor filled instruments is considerably less than that for mercury. Friction damping may vary considerably increasing the hazard for failure unless the operating forces are appreciably more than the normal requirements. The shock absorber of the Nelson application reduces the speed of the compensating arm just before it contacts the limit stops; however, although the speed of operation of the unit does not affect accuracy directly, it is not desirable for the compensator arm to contact the limit stops with excessive force. On the other hand, it is important for the unit to operate as fast as possible. The use of friction or hydraulic means as a damping or retarding force for the measuring arm on the return stroke is substituted for in the present invention by employing instead, shorting conductors through a strong magnetic field. The use of a frictionless drag on the system permits a structure having the minimum possible operating forces. This arrangement has a definite advantage in use with the vapor filled sensing element.

In the bi-metallic structural arrangement to compensate for changes in the ambient air temperature, the effect of the expansion and contraction of the base metal in the compensating counter indicated that an error resulting from a change in the ambient air temperature of 100° F. could be as high as .046 percent at the point of maximum extension of the compensating probe. To reduce this error or eliminate it altogether, bimetallic structural members are designed in the present invention in such a way that the expansion in the direction that produces the error is offset by an equal magnitude of expansion in the opposite direction. Thus, the location of the probe for the sensing element is maintained fixed at all ambient air temperatures.

The apparatus of the invention is especially useful in the metering of crude oil; however, it is also useful in the measurement of other liquids.

Thus a primary object of the present invention is to provide improved apparatus for accurately compensating for volume differences of a liquid resulting from changes in a factor that affects the measurement of the liquid or for a volume variation caused by a selected correction to be applied. In either case the compensation may be automatically made in each fill-discharge cycle of a fill-dump type meter.

In brief, the invention comprises linearly movable means adapted to move selected amounts representative of selected volumes of the liquid, rotatable means connected to the linearly movable means, the amount of rotation of the rotational means being proportional to the amount of linear movement of the linearly movable means, means for limiting the amount of movement of the rotatable means in response to change in the factor (or the tank volume), counter means adapted to register the amount of rotation of said rotatable means, clutch means releasably interconnecting said rotatable means and said counter means, said clutch means including fluid pressure expansible, retractable, metallic bellows. Fluid pressure may be provided for moving the movable means. The invention also includes magnetic dampening means adapted to retard movement of said rotatable means adjacent each end of its stroke. Also, the invention includes employing a movable probe as said means for limiting the amount of movement of said rotatable means in response to changes in said factor, said probe being mounted on a carriage movable toward and away from the pivot point of said rotatable means which is mounted, in turn, on a stationary base, a metallic screw member connected to said movable carriage and said metallic stationary base adapted to move said carriage on said base, the coefficient of expansion of the metal of said screw member being less than the coefficient of expansion of the metal of said stationary base member so that the relative movement between the stationary base and the screw member causes the probe to remain the same distance from the pivot point.

The above object and other objects of the invention will be apparent from a more detailed description of the invention including its operation when taken in conjunctio with the drawings wherein:

FIG. 1 is a partly sectional view of one embodiment of the invention;

FIG. 2 is a view taken on lines 2—2 of FIG. 1;

FIG. 3 is a view taken on lines 3—3 of FIG. 1;

FIG. 4 is a view taken on lines 4—4 of FIG. 1;

FIG. 5 is an enlarged view of the clutch mechanism and associated metallic bellows; and FIG. 6 is a schematic view of the eelments of the invention illustrating the operation of the invention in conjunction with a metering tank.

Referring to the drawings in greater detail, in FIG. 1 is shown an actuating cylinder 10 in which is arranged a piston 11 movable or reciprocal in cylinder 10 by means of fluid pressure supplied through conduits 12 and 13. A crank 14 connected at one end to and reciprocal with movement of piston 11 is connected at its other end to a pin 15 attached to a circular rotatable compensator drive plate 16, which, in turn, is connected directly to a compensator drive shaft 17. Instead of crank 14 and pin 15, a rack gear and pinion may be used to translate linear movement of piston 11 to rotational movement. Compensator drive plate 16 has attached to one side thereof an arm 18 upon the end of which is mounted a permanent magnet 19. As seen also in FIG. 4, partly surrounding plate 16 is a magnetically permeable arc shaped member 20 at each end of which is arranged a series of conductors 21. Member 20 and conductors 21 installed therein are circumferentially located in an indentation 23 formed in magnet 19. During the circumferential traverse of plate 16, the magnetic field produced by magnet 19 sweeps across conductors 21. Shorting bars 22 complete the electrical circuit induced by relative movement of the conductors 21 in the magnetic field produced by magnet 19 and slow down movement of plate 16. A sweep arm 24 connects to and extends from another side of compensator drive plate 16. The travel of sweep arm 24, confined between a manually adjustable fixed stop 25 which may be adjusted by means of a micrometer element 26 and a variable factor actuated probe 27, is slowed at each end of its arc of travel by the magnetic brake comprised of magnet 19 and shorting bars 22.

As seen in FIGS. 1 and 3, the variable factor actuated probe 27 is mounted on a movable support 28, which, in turn, is mounted on a stationary base support 29. Probe 27 is secured to support plate 28 by means of brackets 30 and 31 and screws 32. Probe 27 connects to a fluid motor 33 to which fluid movements, which vary in response to changes in the factor, are transmitted from a factor control element. A spring 34 surrounds probe 27 and biases it to the left, as seen in FIGS. 1 and 3, against the action of fluid pressure on probe 27 through motor 33. Base support 29 and plate support 28 are formed with cooperating grooves, indicated at 35 and 36, in which are arranged guide keys 37 and 38, respectively. Oblong openings 39 and 40 formed in movable support 28 have extending therethrough screw members 41 and 42, respectively, which are attached to base support 29. As seen in FIG. 3, nuts 43 and 44 are connected to screw members 41 and 42, respectively. Spring washers 45 may be provided, if desired. As seen more clearly in FIGS. 2 and 3, support 28 moves in a slot 46 (note dotted lines in FIG. 3) in base support 29. An adjusting screw 47, provided with a knurled handle 48 at one end thereof, screw-threadedly engages support member 28, as indicated at 49 and is secured at the end thereof to base member 29, as indicated by bracket 50 screw-threadedly secured to base member 29 and also secured to adjusting screw 47. Rotation of adjusting screw 47 by rotation of handle 48 moves support plate 28 and mounted probe 27 toward and away from the center line of shaft 17; that is, the pivot point of arm 24. Since the greater the amount of travel of the arc swept by a point on sweep arm 24, the less effect the amount of movement of probe 27 has on the rotation of shaft 17, the ability to move the probe toward and away from the pivot point provides minute control of the amount of rotation of shaft 17 with respect to a specific movement of probe 27. As mentioned previously to eliminate error resulting from changes in ambient air temperature, bi-metallic structural components are employed. As seen in FIG. 2, the location of the center line of the anchoring connection 50 between base 29 and adjusting screw 47 is determined by the relative coefficients of expansion between the metal in adjusting screw 47 and the metal of base 29. For example, as the anchor point 50 expands in an upward direction with an increase in ambient air temperature, there is a corresponding increase in the length of the adjusting screw 47 between anchor point 50 and probe support 28. By forming the adjusting screw of metal having a coefficient of expansion less than, e.g., one half the coefficient of expansion of the metal of base 29, relative movement between these two parts causes probe 27 to remain always in the same position. A rotation type counter 51 is provided with rotatable drive shaft 55 to which is connected one plate or face 52 of an engageable-disengageable clutch mechanism. The other plate 53 of the clutch is mounted on a metallic bellows 54 which is screw-threadedly connected to rotatable shaft 17 which is mounted on bearings 56 which, also, are mounted on base member 29. Drive plate 16 is connected to rotatable shaft 17 by means of screws 57. Bellows 54 consists of a series of metal diaphragms attached to one another so that large deflections for small diameters are obtained. Extension of bellows 54 to engage clutch plates 52 and 53 to lock the movable members, so that the amount of rotation of the compensator shaft 17 is transmitted to counter shaft 55, is achieved by fluid presusre acting on the bellows. This fluid pressure is transmitted to bellows 54 through a conduit 58. The flexible metal bellows retracts automatically upon exhaust of fluid pressure from conduit 58. FIG. 5 shows the construction of bellows 54 and its connection to clutch plate 53 in more detail. Clutch plate 53 may be formed of stainless steel or monel. Clutch plate 52 shown spaced from clutch plate 53 may be provided with a rough finish and may be formed of brass or "Mikarta" having a linen base.

The operation of the apparatus in conjunction with temperature compensation for a dump type meter is illustrated in FIG. 6. The temperature (or other factor) control mechanism may be any desired type, e.g., the control may constitute a temperature sensitive bulb 60 containing a fluid such as mercury which expands and contracts in response to increases and decreases in temperature, respectively, extending into a liquid contained in a tank 61 provided with a fill-dump valve 62. Expansion and contraction of the fluid contained in bulb 60 and tube 63 causes movement of a diaphragm (or piston) within motor 33 and, in turn, movement of probe 27 connected to the diaphragm.

A valve means 70 connects a fluid supply conduit 71 (which is also connected to a source of fluid supply, not shown) to condutis 12 and 13, which, in turn, fluidly communicate with actuating cylinder 10. When in use with the metering tank temperature compensator illustrated, it is desirable to rotate counter shaft 17 when bulb 60 is submerged and preferably when the tank is completely full. Therefore, a measurement may be made when the tank begins to dump. A handle 72 connected to valve means 70 has an upper dump and a lower fill position. Another valve means 73 connects a fluid supply conduit 74 (which also is connected to a source of fluid supply, not shown) to a conduit 75, which, in turn, fluidly communicates with conduit 58 and metallic bellows 54. Valve means 70 and 73 are also provided with exhaust conduits 76 and 77, respectively. Also, a handle 78 connected to valve means 73 has upper dump and lower fill positions.

In operation, when it is desired to take a measurement, handle 72 is moved to the up position, as shown, and fluid pressure from the fluid supply is transmitted through conduit 71 and valve means 70 and conduit 12 to actuating cylinder 10 and fluid pressure is released from cylinder 10 through conduit 13 and vent line 76. As seen in solid lines, the initial position of arm 24 is adjacent to the micrometer adjustable stop 25 and arm 24 is maintained against this stop by fluid pressure acting on the underside of piston 11 when handle 72 is in the down position. Fluid pressure acting on piston 11 in actuating cylinder 10 moves arm or crank 14 downwardly which causes plate 16 connected to arm 14 through pin 15 to rotate, which, in turn, rotates sweep arm 24 until it contacts probe 27 as indicated by the dotted line illustration of arm 24. The exact position of probe 27 is dependent upon the temperature of the liquid within tank 61. Fluid in bulb 60 expands or contracts depending upon whether the temperature of the liquid in tank 61 is above or below a standard temperature. When the temperature of the liquid within tank 61 increases, fluid within bulb 60 expands through capillary tube 63 and motor 33 and causes probe 27 to move to the right. Movement in this direction shortens the travel of arm 24. Contrariwise, when the fluid in bulb 60 contracts, fluid in capillary tube 63 contracts causing probe 27 to move to the left. Probe 27 in its new position permits a longer travel for sweep arm 24.

As a particular example, with probe 27 positioned for a standard 60° F. temperature within tank 61, tank 61 is filled with liquid, the temperature of which by means of bulb 60 and motor 33 varies the position of probe 27, which, in turn, determines the travel of arm 24. If the temperature of the liquid in tank 61 were 80° F., the correction required would be approximately one percent.

To achieve rotation of the counter shaft 55 at the proper time a fluid pressure signal is applied through conduits 74, 75 and 58 to bellows 54 by raising handle 78 to the up position which expands bellows 54 and moves clutch plate 53 to the left to engage clutch plate 52 and lock counter shaft 55 to shaft 17. Once locked, rotation of sweep arm 24 rotates shaft 55 and registers this movement on rotatable type counter 51. The magnetic brake dampens movement of arm 24 at each end of its stroke.

With a one percent correction for increased temperature, counter 51 would register 0.99 tankful or barrel or other unit of measure. A decreased temperature of the liquid in tank 61 would operate similarly to register more than one tankful or barrel.

The term "liquid" as used herein means primarily a liquid phase with or without a small amount of dissolved or entrained gases.

The apparatus has been described with regard to manual operation of the fluid supply to the cylinder 10 and to the bellows 54. However, it is to be understood that the invention is readily employable in automatic metering operations. For example, valves 70 and 73 can be connected into a pilot pressure system for automatic metering in a manner such that the clutch faces engage in recording position and arm 24 sweeps downwardly when the metering tank has filled and the clutch faces disengage and arm 24 sweeps upwardly to reset these elements when the metering tank has emptied.

An example of an automatic metering operation in which a fluid sampler is actuated similarly to the automatic operation contemplated for the present device is found in U.S. patent application Ser. No. 588,687, filed June 1, 1956, entitled "Fluid Sampler," by William A. Pitts.

Having fully described the operation, objects, and elements of my invention, I claim:

Apparatus for correcting the volume of liquid measured in a metering tank to compensate for volume differences of the liquid resulting from changes in a factor that affects the measurement of the liquid comprising a stationary metallic base; rotatable means having a fixed axis of rotation and mounted on said base and movable variable amounts within an arc from an initial position to selected terminal positions and vice versa, each terminal position being representative of selected volumes of said liquid; counter means adapted to register the amount of rotation of said rotatable means; clutch means disengageably connecting said rotatable means and said counter means whereby when connected, said counter means rotates with said rotatable means, said clutch means including a fluid pressure expansible self-retracting metallic bellows arranged on said rotatable means, a clutch plate positioned on one end of said bellows, and another clutch plate arranged on said counter means adapted to engage with the clutch plate on said bellows when said bellows expands and to disengage from the clutch plate on said bellows when said bellows retracts, a movable carriage mounted on said base and movable relative thereto adapted to move toward and away from the axis of rotation of said rotatable means; a probe mounted on said movable carriage and automatically movable in response to changes in said factor engagedly connecting with said rotatable means to terminate said movement of said rotatable means at one of said selected positions, the amount of movement of said rotatable means as determined by said selected positions being dependent upon the change in said factor; a metallic screw member interconnecting said movable carriage and said stationary base adapted to move said movable carriage, said metallic screw member being formed of metal having a lesser coefficient of expansion than the metal of which the stationary base is formed so that said probe remains the same distance from the axis of rotation of said rotatable means regardless of change in ambient air temperatures; and magnetic brake means arranged on said base and said rotatable means adapted to dampen movement of said rotatable means adjacent the extremities of the reciprocating movement of said rotatable means.

References Cited in the file of this patent

UNITED STATES PATENTS

| | | |
|---|---|---|
| 2,019,146 | Livermore | Oct. 29, 1935 |
| 2,061,894 | Carlson | Nov. 24, 1936 |
| 2,357,356 | Petty | Sept. 5, 1944 |
| 2,432,272 | Bariffi | Dec. 9, 1947 |
| 2,438,935 | Marsh | Apr. 6, 1948 |
| 2,806,374 | Granberg | Sept. 17, 1957 |
| 2,851,014 | Healy | Sept. 9, 1958 |
| 2,876,641 | Brown | Mar. 10, 1959 |
| 2,894,392 | McLaughlin | July 14, 1959 |
| 3,100,396 | Nelson | Aug. 13, 1963 |